No. 773,767. PATENTED NOV. 1, 1904.
F. B. ROSCOW.
ANIMAL TRAP.
APPLICATION FILED JUNE 10, 1903.
NO MODEL. 2 SHEETS—SHEET 1.

WITNESSES:

INVENTOR.

No. 773,767. PATENTED NOV. 1, 1904.
F. B. ROSCOW.
ANIMAL TRAP.
APPLICATION FILED JUNE 10, 1903.
NO MODEL. 2 SHEETS—SHEET 2.

WITNESSES:
J. Hmgg Poole
L. B. Middleton

INVENTOR
Frank B. Roscow.
BY Herbert W. J. Jenner.
Attorney

No. 773,767. Patented November 1, 1904.

UNITED STATES PATENT OFFICE.

FRANK BENEDICT ROSCOW, OF SOUTH AUBURN, NEBRASKA.

ANIMAL-TRAP.

SPECIFICATION forming part of Letters Patent No. 773,767, dated November 1, 1904.

Application filed June 10, 1903. Serial No. 160,950. (No model.)

*To all whom it may concern:*

Be it known that I, FRANK BENEDICT ROSCOW, a citizen of the United States, residing at South Auburn, in the county of Nemaha and State of Nebraska, have invented a new and useful Animal-Trap, of which the following is a specification.

My invention relates to a new and improved trap, machine, or contrivance for catching and entrapping animals or birds by means of a wheel consisting of a series of paddles or fans—four in number, more or less—fixed to an axle or shaft which would commonly be called a "paddle" or "fan" wheel provided with the necessary trips and stops or catches placed within a frame, covering, or box, either single or double, the wheel or wheels being made to revolve by the weight of the animal or bird on one of the horizontal paddles or fans locked by a trip or catch which is released when the animal or bird steps on the proper trip or catch, which precipitates the animal or bird into a lower section of the frame or box, from which it passes into a receptacle provided for its reception, leaving the wheel in the same position as before.

I attain my object by the mechanism illustrated in the accompanying drawings, in which—

Figure 1:
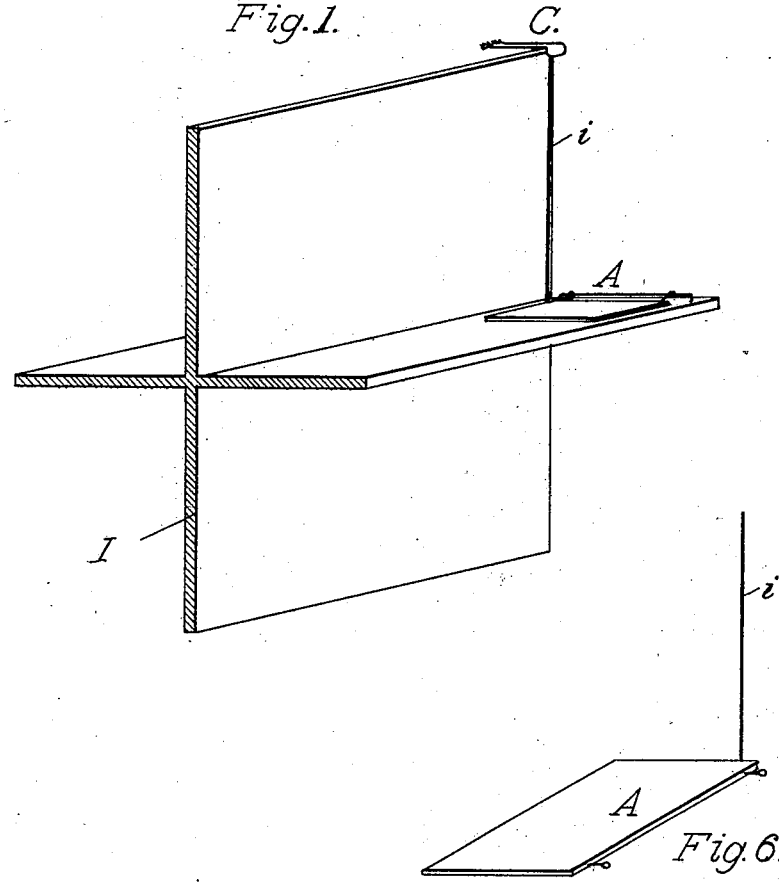
Figure 2:
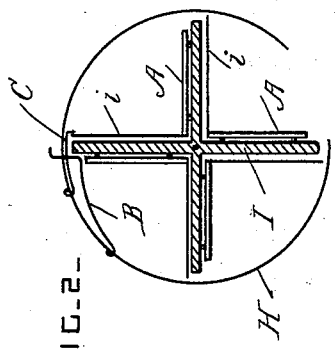
Figure 3:
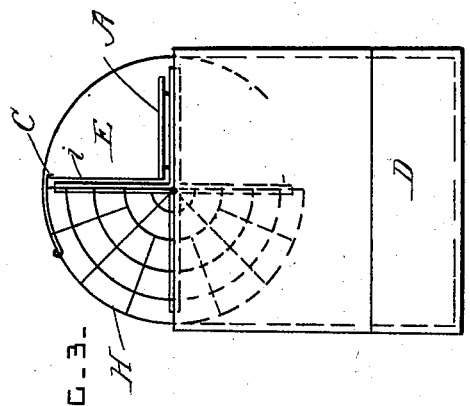
Figure 4:
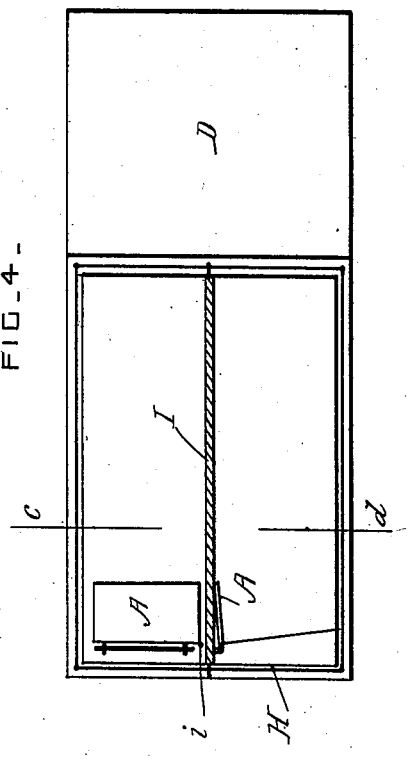
Figure 5:
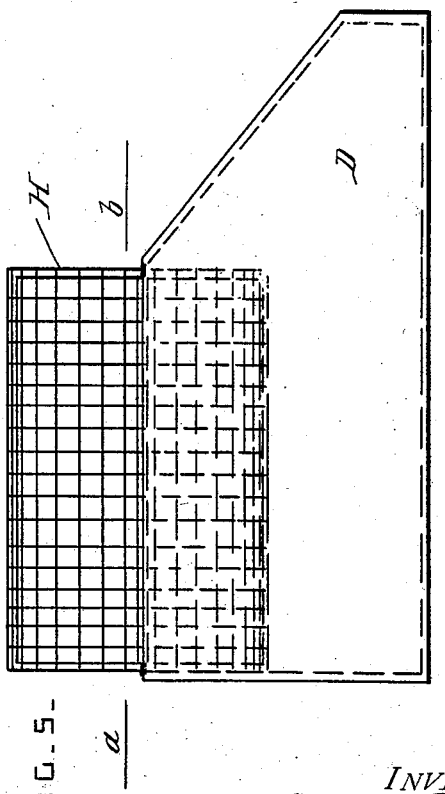

Figure 1 is a sketch and view of the paddle-wheel provided with a trip, this trip being attached to the paddle or fan and designated by the letter A. Fig. 2 represents a section of the wheel, taken on the line $c\,d$ in Fig. 4, together with the stop B, fastened to the frame, which prevents the wheel from taking a backward motion, and also stop C, fastened to the frame, which prevents it from taking a forward motion until trip A is again released. Fig. 3 represents an end view of the wheel placed in a frame with one section, E, open for the entrance of the animal or bird. Fig. 4 represents a sectional elevation, as seen from above, taken on the line $a\,b$ in Fig. 5 and shows the wheel in a frame in which the trip A is represented on the horizontal and also on the vertical paddle or fan. Fig. 5 represents a side view of the frame as placed upon a receptacle of shape as indicated by letter D. Fig. 6 is a view of trip A disconnected from frame or from paddle or fan.

H is an inclosing cage which has an opening at one end, and I is a cross-shaped paddle-wheel journaled in the said cage.

B is a spring-stop secured to the cage. This stop permits the paddle-wheel to revolve in one direction and prevents it from revolving in the reverse direction.

A is a trip-board which is pivoted to one of the blades of the paddle-wheel crosswise of its axis. A rod or wire $i$ projects from one side of the trip-board close to the adjacent blade, and when the trip-board is raised clear of the blade to which it is pivoted the free end portion of this rod $i$ engages with a catch C, which is secured to the cage.

When a bird or animal enters the open section E and steps on the trip-board A, its weight moves the rod $i$ longitudinally of the axis of the cage out of engagement with the catch C. The weight of the bird or animal then partially revolves the paddle-wheel, so that the bird or animal is caught in the cage.

The rod or wire $i$ is arranged in a position where the bird or animal is not likely to obstruct its free action, and it can easily be bent and adjusted so that a very light weight will operate it.

What I claim is—

In a trap, the combination, with an inclosing cage having an opening at one end, and a catch secured to the said cage; of a paddle-wheel journaled in the said cage, a trip-board pivoted to one of the blades of the said paddle-wheel crosswise of its axis, and a rod which projects from the side of the said board and which normally engages with the said catch, the free end portion of the said rod being moved longitudinally of the axis of the paddle-wheel out of engagement with the said catch when the said board is depressed.

FRANK BENEDICT ROSCOW.

Witnesses:
   WYMER DRESSLER,
   E. B. QUACKENBUSH.